United States Patent [19]

Huang

[11] Patent Number: 4,761,014
[45] Date of Patent: Aug. 2, 1988

[54] PROPULSION OF SCOOTERS
[76] Inventor: Kung-Hsiung Huang, No. 37, Lane 490, Pei-Tun Rd., Pei-Tun District, Taichung City, Taiwan
[21] Appl. No.: 43,449
[22] Filed: Apr. 28, 1987
[51] Int. Cl.⁴ ............................................. B62M 1/04
[52] U.S. Cl. ................................. 280/258; 74/594.7; 280/87.04 R; 280/255
[58] Field of Search ............... 280/87.04 R, 251, 258, 280/253, 255; 74/575, 576, 577 R, 594.4, 594.7

[56] References Cited
U.S. PATENT DOCUMENTS
1,509,898 9/1924 McConnell ...................... 280/258
1,788,774 1/1931 Matushak ........................ 280/258
2,225,304 12/1940 Killen ............................. 280/258

FOREIGN PATENT DOCUMENTS
27676 7/1931 Australia ........................ 280/258
590819 6/1925 France ........................... 74/594.7
18156 of 1897 United Kingdom ............. 280/258
484 of 1898 United Kingdom ............. 280/258

Primary Examiner—John J. Love
Assistant Examiner—Everett G. Diederiks, Jr.
Attorney, Agent, or Firm—Oblon, Fisher, Spivak, McClelland & Maier

[57] ABSTRACT

A scooter of an ordinary general shape but equipped with an improved mechanical drive for the rear wheel or wheels, which drive is comprised of a ratchet mechanism for driving the rear wheel, a stepping lever for transferring the stepping force of the rider to the ratchet mechanism and a retrieving means for raising the stepping lever to the orignal position as the stepping force is released therefrom; whereby, the scooter can be propelled by the intermittent force of the rider to advance forwardly.

1 Claim, 3 Drawing Sheets

PROPULSION OF SCOOTERS

BACKGROUND OF THE INVENTION

The present invention relates to scooters propelled by the stepping force of the rider, and more particularly to scooters having a pedal for operating their wheels.

As is well known, a scooter of an ordinary type represents a low two-wheeled vehicle with a steering post and a low platform on which the rider stands with his feet. The propelling force, when not coasting, is furnished by pushing one foot against the ground while the other foot is standing on the low platform.

Scooters of this type, while providing a healthy exercise, cannot hold the user's interest for a long time as the method of the operation is so monotonous.

Scooters of a type propelled by the weight or the stepping force of the rider via chain sprockets have been designed and developed. However, scooters of this type have complex propulsion mechanisms and cannot retreat backwardly for reasons of such mechanisms.

SUMMARY OF THE INVENTION

An object of the present invention is to provide a scooter comprising a ratchet mechanism for driving the rear wheel of the scooter, a stepping lever for transferring the stepping force of the rider to the ratchet mechanism and a retrieving means for raising the stepping lever as the stepping force is released therefrom, whereby the scooter can be propelled by the intermittent stepping force of the rider to advance forwardly.

Another object of the present invention is to provide a scooter further comprising a releasing means for disengaging the ratchet mechanism, whereby the scooter can be pulled backwardly without any obstruction caused by the ratchet mechanism.

Therefore, the primary objective of the present invention is to provide a scooter with simple mechanisms, which can be propelled by the intermittent stepping force of the rider and pulled backwardly without any obstruction caused by such propulsion mechanisms.

BRIEF DESCRIPTION OF THE DRAWINGS

The present invention is illustrated by way of examples in the accompanying drawings, in which:

FIG. 4 is a schematic representation of the propulsion mechanisms showing the stepping force is applied on;

DETAILED DESCRIPTION OF THE INVENTION

Figure 1:
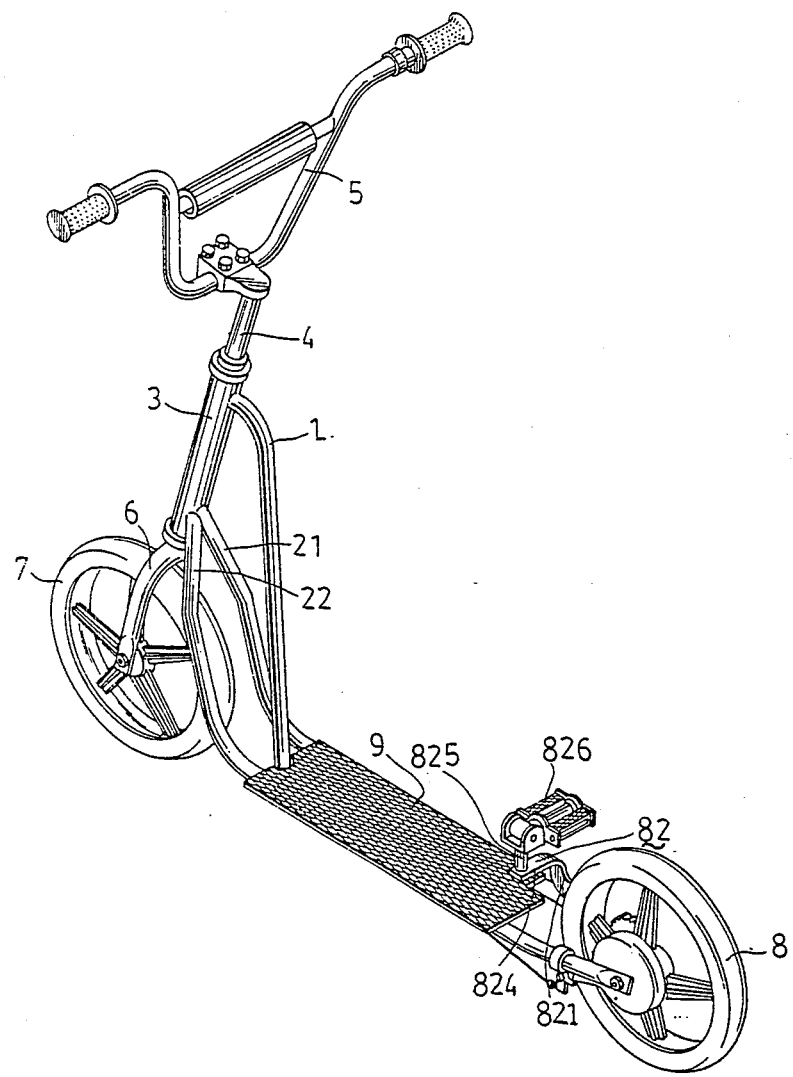
FIG. 1 is a perspective view of the scooter according to the present invention.
Figure 2:
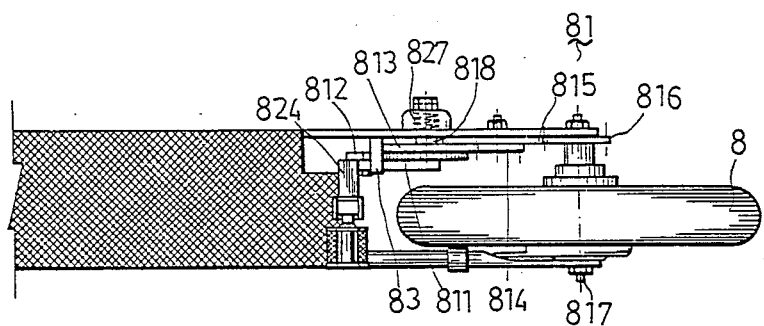
FIG. 2 is an enlarged top plan view of FIG. 1.
Figure 3:
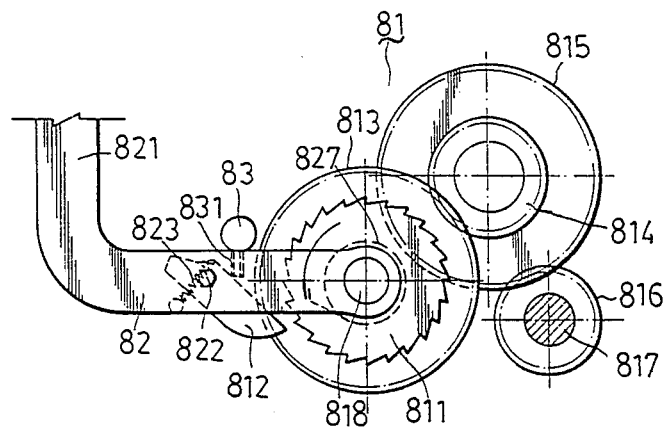
FIG. 3 is a schematic representation of the propulsion mechanisms showing the stepping force is in a released state.
Figure 4:
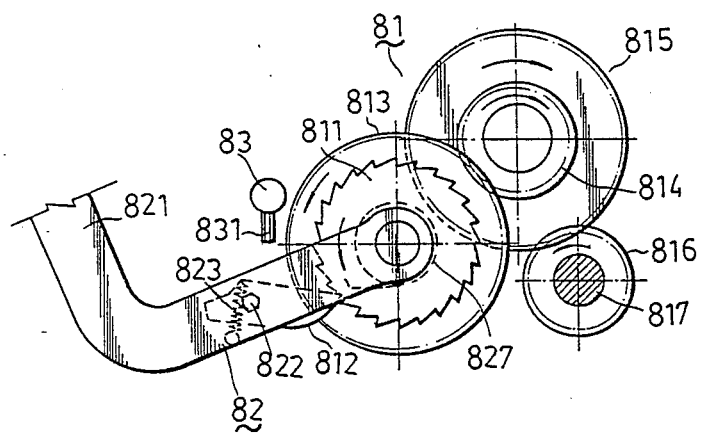

The best mode of the present invention is to construct a scooter of an ordinary general shape, as shown as the overall figuration of FIG. 1, but provided with a mechanical drive for the rear wheel or wheels, as shown by the mechanisms illustrated in FIG. 2 to FIG. 4.

Referring to FIG. 1, the scooter consists of a curved tube 1 forming a frame and having extensions 21, 22 for supporting a front tubular portion 3 in which a steering rod 4 is mounted. The rod 4 has a steering handle 5 on top and a fork 6 at the lower end for a front wheel 7. The rear ends of the extensions 21,22 form as a fork for a rear wheel 8. A platform 9 is supported by the two extensions 21,22.

Referring to FIG. 2 to FIG. 4, the rear wheel 8 is provided with a ratchet mechanism 81 comprising a ratchet wheel 811, ratchet pawl 812 and a set of transmission gears 813,814,815,816 for amplifying and transferring the rotational distance of each motion pitch of the ratchet wheel 811 to the rear wheel 8. As shown in the figures, the last gear 816 is mounted on the shaft 817 of the rear wheel 8.

There is a stepping lever 82, one end of which has a vertical extension 821 for stepping by rider and one end of which is hingedly mounted on a shaft 818 transversely extending from the extension 21. A retrieving means 827, such as a spring, is mounted between the shaft 818 and the stepping lever 82 for raising the stepping lever 82 to horizontal position as the stepping force is released. The ratchet wheel 811 and the gear 813 are monoblocked and journalled in the shaft 818 so that they can be rotated together therein. The ratchet pawl 812 is hingedly mounted on a pin 822 transversely extending from the stepping lever 82 so that the ratchet pawl 812 can be rocked by the stepping lever 82 and intermittently push the ratchet wheel 811 to rotate the gears 813,814,815,816 and the rear wheel 8.

A releasing means 831 is downwardly mounted on a rod 83 which is mounted on the extension 21 and disposed across the top side of the stepping lever 82. Referring to FIG. 3, as the stepping force is released and the stepping lever 82 is raised to the horizontal position by the action of the retrieving means 827, the ratchet pawl 812 will be pressed by the releasing means 831 and moved downwardly so that the ratchet pawl 812 can disengage from the ratchet wheel 811. As the stepping force is applied on the stepping lever 82, as the condition shown in FIG. 4, the stepping lever 82 will rock downwardly and the ratchet pawl 812 will disengage from the releasing means 831 so that the ratchet pawl 812 can be retrieved to the original position by the spring 823, as shown in the figure, and engage with the ratchet wheel 811.

Referring to FIG. 1 and FIG. 2, the vertical extension 821 further comprises a horizontal extension 824 transversely extending from the end of the vertical extension 821 to the top side of the mid-portion of the platform 9. The horizontal extension 824 can be finished or shaped to adapt to be stepped by the rider. But, as shown in the figures, the horizontal extension 824 of this embodiment further comprises a vertical extension 825 therefrom. There is a pedal 826 hingedly linked at the top end of the vertical extension 825. The pedal 826 can be rotated 180 degrees to the other side to adapt to accept the stepping force of the other foot. That is to say, we may dispose the pedal 826 on the right side for the right foot while the left foot is standing on the platform, and vice versa.

Further referring to FIG. 1 to FIG. 4, the rocking stroke of the stepping lever 82 can be limited by the platform 9, as the stepping force is applied on, and by the rod 83, as the stepping force is released from the pedal 826.

As in the above-mentioned embodiment, the scooter with propulsion mechanisms, according to the present invention, can be propelled by the stepping force of the rider and pulled backwardly when the stepping force is in a released state.

Figure 5:
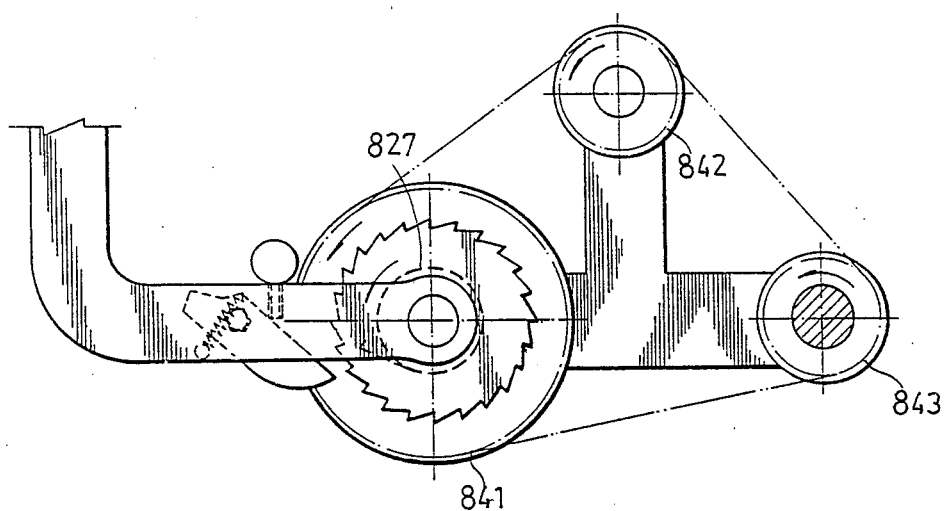
FIG. 5 is a schematic representation of the propulsion mechanisms of another embodiment according to the present invention.

While the invention has been described in connection with what is presently considered to be the most practical and preferred embodiment, it is to be understood that the invention is not to be limited to the disclosed embodiment, but, on the contrary, is intended to cover various modifications and equivalent arrangements included within the spirit and scope of the broadest interpretation so as to encompass all such modifications and equivalent arrangements. For example, we may modify the gear arrangement of transmission gears 813,814,815,816 to belt gearing arrangement of the gears 841,842,843, as shown in FIG. 5, etc.

What is claimed is:

1. A scooter having a frame, a steering post in the front portion of the frame, a front wheel supported on the post, a fork at the rear of the frame, a rear wheel rotatably supported in the fork, a ratchet mechanism for driving the rear wheel, a stepping lever for transferring the stepping force of the rider to the ratchet mechanism, a retrieving means for raising the stepping lever to the original position as the stepping force is released therefrom and a releasing means for disengaging the ratchet mechanism, wherein the ratchet mechanism comprises a rotational ratchet wheel, a ratchet pawl for intermittently driving the ratchet wheel pitch by pitch and a set of transmission gears for amplifying and transferring the rotational length of each motion pitch of the ratchet wheel to the rear wheel, wherein the stepping lever comprises a horizontal portion, one end of which is hingedly mounted on the frame, a vertical portion extending from the other end of the horizontal portion, and a pin transversely extending from the horizontal portion for hingedly mounting said ratchet pawl whereby the ratchet pawl can be rocked by the stepping force applied on the stepping lever to intermittently push the ratchet wheel to rotate pitch by pitch, wherein the releasing means is disposed above the ratchet pawl and there is a spring stretching between the ratchet pawl and the stepping lever whereby the ratchet pawl can be moved downwardly and disengaged from the ratchet wheel by the releasing means when the stepping force is in a released state and retrieved to the original position and engaged with the ratchet wheel by the spring as the stepping force is applied on the stepping lever, and wherein the stepping lever further comprises a second horizontal portion transversely extending from an end of the vertical portion to a position above a mid-portion of the frame, a second vertical portion extending from the second horizontal portion and a pedal hingedly linked at the top end of the second vertical portion.

* * * * *